April 16, 1935.   J. W. WEAVER   1,997,955
VALVE STRUCTURE
Filed May 24, 1933
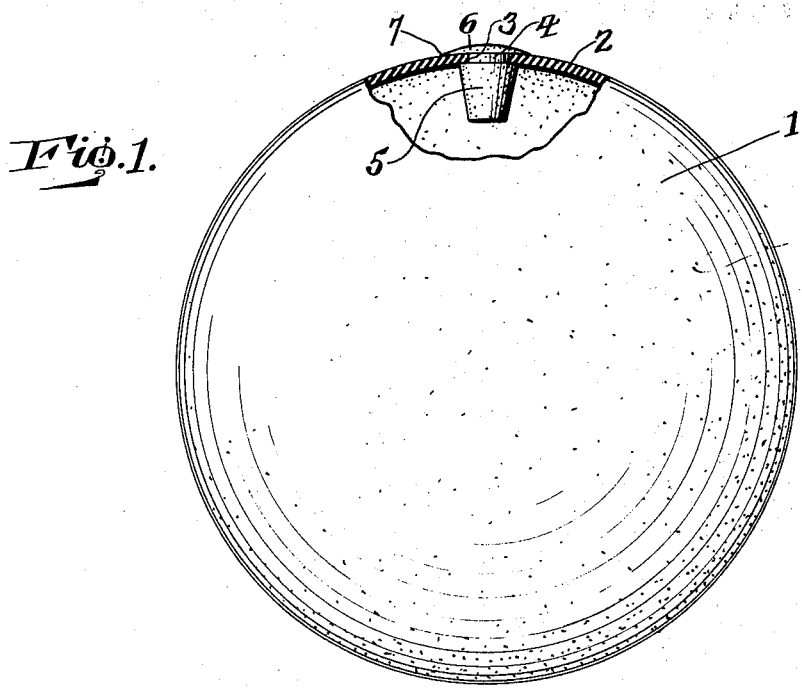
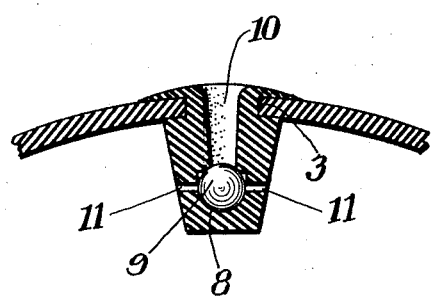
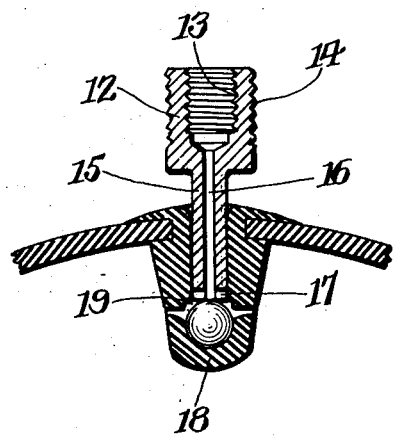
Inventor
Joseph W. Weaver
By Geo. P. Kimmel
Attorney Patented Apr. 16, 1935

1,997,955

UNITED STATES PATENT OFFICE 1,997,955

VALVE STRUCTURE

Joseph W. Weaver, Lebanon, Pa.

Application May 24, 1933, Serial No. 672,700

6 Claims. (Cl. 273—65)

This invention relates in general to valves and more particularly has reference to a valve structure for use in connection with a flexible inflatable container.

This invention is applicable to inflatable balls and the like for use in connection with various athletic sports and games. Such balls in the past have either been made in the form of a permanently sealed inflated container of some suitable flexible resilient material, or have been made with a valvular member through which it might be inflated. These valvular members have sometimes been merely tubes or tubular extensions positioned externally of the container and communicating with the interior thereof. In many cases it has been necessary to tie or bind these tubular extensions after the inflation of the container in order to prevent the escape of the air or other fluid used for the purpose of inflation. These tubular extensions have also been provided with metallic valve structures which serve to prevent the escape of air thus maintaining the container in its inflated condition. These valves have ordinarily been of metallic construction frequently consisting of a metallic valve member resiliently seated by means of a metallic spring pressing thereagainst, a metallic support for the spring being anchored within the tubular member. The tubular member has in such instances necessarily been made rigid enough to support the metallic parts and to prevent any undue distortion which might displace the valve member from its seat.

In such construction as above set forth, where the tubular member is positioned outside of the container, no matter how tightly it is tied or held against the wall of the container, it always forms a bulge and considerable unevenness in the general contour of the outer surface thereof. This is extremely undesirable in connection with balls used in games of skill since it disturbs the accuracy with which the ball rebounds when it strikes upon this unevenness. Furthermore, this tubular member is always exposed to any damage which may result from such contact and for this reason this form of valve member has proven entirely unsatisfactory.

When a valve member of this sort is placed interiorly of the container, and provided with metallic valve construction of the type above set forth, it possesses several disadvantages. First of all, it is extremely expensive to manufacture the various parts and to properly locate them within the tubular member during the process of manufacture. In the second place, these tubular members as above explained are necessarily made somewhat rigid and interfere with the proper flexing of the walls of the container. In the third place, it will be seen that such a device is very apt to have its interior of metallic parts displaced, and when such parts are so displaced it is impossible to gain access to them for the purpose of properly positioning them. They form a somewhat complicated mechanism which is subject to various difficulties and is inaccessible for the purpose of repair.

In view of the above, it is an object of this invention to provide a valvular construction for a container of this sort, wherein it will be unnecessary to tie up or otherwise close any tubular connection after the container has been inflated for the purpose of retaining it in that condition, and wherein no bulge will be produced on the outer surface of the container but in which the outer surface will be left substantially of the same contour at points adjacent the valvular construction and at points more remote therefrom. At the same time, it is an object of this invention to provide a valvular construction which may be flexed in practically any direction without disturbing the effectiveness thereof, and which contains no parts capable of getting out of order or out of position during ordinary usage. It is furthermore an object that this construction shall be simple and inexpensive to manufacture as well as positive and unfailing in its operation.

Other objects and advantages of this invention will become apparent from the following description taken in connection with the accompanying drawing, it being distinctly understood that the same are by way of example and illustration only and are not to be taken as in any way limiting the spirit or scope of this invention. The spirit and scope of this invention is to be limited only by the prior art taken in connection with the accompanying claims.

Referring now more particularly to the drawing in which like numerals indicate corresponding parts throughout:

Figure 1 is a view of a container constructed in accordance with this invention, the same being shown partly in section for the purpose of illustrating the valvular construction.

Figure 2 is a cross section of the valvular construction illustrated in Figure 1.

Figure 3 is a view similar to Figure 2 illustrating the position of the various parts during the process of inflation.

In this illustration, the container is illustrated as consisting of a ball 1 having a resilient wall 2.

At one side of the ball, the wall 2 is provided with an opening 3 for the purpose of receiving the reduced portion 4 of the tubular resilient valve member 5. This reduced portion 4 extends through the opening 3 in the wall 2 and is maintained in position by means of the tapered flange 6. This tapered flange 6 as illustrated tapers toward its outer edge to a knife edge 7 which merges with the contour of the ball 1. The portion of the tubular member 5 which is positioned interiorly of the ball 1 is substantially frustro-conical in shape and forms a shoulder adjacent the reduced portion 3, which shoulder bears against the inner surface of the wall 2. This shoulder, the reduced portion 4, and the flange 6 are so formed and related with respect to each other as to form a sealed connection with the wall 2 about the opening 3, and are preferably secured to this wall by some means such as vulcanization.

Adjacent the inner end of the tubular member 5 there is provided a valve chamber 8 adapted to receive a valve 9 which is slightly larger than the natural size of the chamber 8 when the valve member 9 is removed. The valve member 9 is preferably spherical and the chamber 8 is preferably spherical in shape except on the side nearest the outer wall, where it is flattened slightly to form a valve seat. The valve member 9 is preferably formed of metal or some other relatively hard and unyielding substance. The tubular member 5, however, is formed of a resilient yieldable material such as soft rubber for a purpose which will hereinafter appear.

Extending from the valve chamber 8 in an outward direction is a passageway 10 connecting the valve chamber 8 with the outside of the container. As shown, this passageway 10 is slightly tapered, being larger at its outer than at its inner end. Extending diametrically of the member 5, from the periphery of one side to the periphery of the other side of the latter, opening at the periphery of said member 5 at diametrically opposed spaced points of the latter, and intersected by the valve chamber 8 is a passageway 11, which is relatively small in diameter with respect to the passageway 10. The intersection of the passageway 11 by the valve chamber 8 provides the former with a pair of endwise aligning spaced branches which, at their inner ends, open into chamber 8 at diametrically opposite points with respect to the latter. The resiliency of the member 5 is such that when pressure is applied to the valve member 9 to remove it from its seat, the inner portions of the branches of passageway 11 will be expanded to increase the diameter thereof at their points of communication with chamber 8. It will be noted that these two passageways 10 and 11 are substantially at right angles to each other and that the valve member 9 is normally held by the resiliency of the material forming the tubular member 5 in such a position as to close both of these passageways and prevent the flow of air either into or out of the container.

For the purpose of inflating the container 1, there is provided a fixture 12 having an enlarged portion threaded interiorly and exteriorly at 13 and 14 respectively for the purpose of receiving a pump connection or other inflating means. This inflating fixture has a lower reduced portion 15 of a size adapted to fit tightly within the passageway 10, this reduced portion being provided with a bore 16 longitudinally thereof for the passage of air into the container. This reduced portion 15 is bifurcated at its ends 17, these bifurcations adapted to bear against the spherical valve member 9 and move it inwardly against the resiliency of the end portion 18 of the tubular member 5 as illustrated in Figure 3. When in this position, it will be seen that the valve member 9 when it has been moved, as aforesaid not only opens the passageway 10 but also the branches of the passageway 11 communicating with the interior of the container. The air is then allowed to pass into the container through the bore 16 between the bifurcated portions 17 through the open portion 19 and out through the branches of the passageway 11. It will be seen that immediately upon the withdrawal of the fixture 12 the valve member 9 will be again forced back into a position to close the passageways 10 and 11 by virtue of the resiliency of the portion 18.

It will be seen from the above that the valve construction which has been provided carries out all of the objects of this invention and provides a valve construction which does not materially alter the outer contour of the container but which at the same time is firmly and permanently connected therewith. It will be appreciated that the tubular member 5 might be made of parts integral with the container 1 if found more desirable. It is further pointed out that the construction set forth does not possess parts which might become dislodged from their proper positions and thus fail to function in their intended manner, yet at the same time it provides a construction which may be flexed in almost any ordinary manner without in any way destroying its effectiveness. It is a construction which is positive in its action, simple and inexpensive to manufacture and which constitutes a distinct advance in the art.

It will be readily understood that various changes may be made in the details of construction and arrangement of parts illustrated in the embodiment herein set forth without departing from the spirit or scope of invention as expressed in the appended claims.

What I claim is:—

1. In a device of the character described, a resilient walled container having an opening therein, a resilient elongated block within said container and forming a valve stem, said block having a reduced portion adjacent one end thereof adapted to fit into said opening and a laterally extending relatively thin flange disposed against the outer surface of said container, said flange tapering to a knife edge at its outer edge and blending with the outer surface of said container, so as to leave the outer contour of the container substantially uninterrupted, said block having a valve chamber therein adjacent its opposite end and having passageways from said chamber to the outside of said container and to the interior of said container, the passageway to the outside of the container being of greater diameter than the passageway to the interior of the container, said passageway opening into the interior of the container, opening at the periphery of said block at diametrically opposite points and intersected intermediate its ends and opening into said chamber at diametrically opposite points of the latter, a hard non-yielding inwardly shiftable valve member of slightly more than the natural size of said chamber, permanently arranged in the latter and adapted to normally close both of said passageways into said chamber, said passageways entering said chamber at points spaced substantially ninety degrees from each other, and the passageway to the interior of said container extending in opposite directions from said chamber whereby when said valve member is moved directly away from said passageway to the outside of the container it will also be moved away from said passageway to the interior of the container, and inflating means of a size to be inserted into said block through said passageway to the outside of the container to move said valve member inwardly against the resiliency of said block away from both of said passageways, said inflating means being hollow and forming a tight fit within said passageway to the outside of the container and having a bifurcated end to bear against said valve member, whereby said container may be inflated.

2. In a device of the character described, a resilient walled container having an opening therein, a resilient elongated block within said container and forming a valve stem, said block having a reduced portion adjacent one end thereof adapted to fit into said opening and a laterally extending relatively thin flange disposed against the outer surface of said container, said flange tapering to a knife edge at its outer edge and blending with the outer surface of said container, so as to leave the outer contour of the container substantially uninterrupted, said block having a valve chamber therein adjacent its opposite end and having passageways from said chamber to the outside of said container and to the interior of said container, the passageway to the outside of the container being of greater diameter than the passageway to the interior of the container, said passageway opening into the interior of the container, opening at the periphery of said block at diametrically opposite points and intersected intermediate its ends and opening into said chamber at diametrically opposite points of the latter, a hard non-yielding inwardly shiftable valve member of slightly more than the natural size of said chamber, permanently arranged in the latter and adapted to normally close both of said passageways into said chamber, said passageways entering said chamber at points spaced substantially ninety degrees from each other, and the passageway to the interior of said container extending in opposite directions from said chamber whereby when said valve member is moved inwardly away from said passageway to the outside of the container it will also be moved away from said passageway to the interior of the container.

3. In a device of the character described, a container, a resilient block extending inwardly from the wall of said container and forming a valve stem, said block having a valve chamber therein inwardly of the container wall and having passageways from said chamber to the outside of said container and to the interior of said container, the said passageway to the interior of said container being intersected intermediate its ends by and opening into said chamber at diametrically opposite points of the latter, said valve chamber having its walls of generally spherical contour and having a flattened portion surrounding said first mentioned passageway disposed inwardly of the regular contour of the spherical portions of said walls, and a hard non-yielding valve member permanently positioned within said chamber, said valve member being of slightly more than the natural size of said chamber and of spherical contour throughout, whereby the valve member will be normally forced by the resiliency of the block to seat more firmly against said portion of the chamber wall surrounding said first mentioned passage than against any other portion of the chamber wall.

4. In a device of the character described, a container, a resilient block extending inwardly from the wall of said container and forming a valve stem, said block having a valve chamber therein inwardly of the container wall and having passageways from said chamber to the outside of said container and to the interior of said container, the said passageway to the interior of said container being intersected intermediate its ends by and opening into said chamber at diametrically opposite points of the latter, said valve chamber having a portion of its wall surrounding said first mentioned passageway projecting inwardly from the regular contour of the major portion of the chamber wall, and a hard non-yielding valve member permanently positioned within said chamber, said valve member being of slightly more than the natural size of said chamber and of the same contour throughout as the regular contour of the major portion of the chamber wall, whereby the valve member will be normally forced by the resiliency of the block to seat more firmly against said portion of the chamber wall surrounding said first mentioned passage than against any other portion of the chamber wall.

5. In a device of the character described, a resilient walled container, a resilient block extending inwardly from the wall of said container and forming a valve stem, said chamber having a valve chamber therein inwardly of the container wall and having passageways from said chamber to the outside of said container and to the interior of said container, the said passageway to the interior of said container being intersected intermediate its ends by and opening into said chamber at diametrically opposite points of the latter, a hard non-yielding valve member of slightly more than the natural size of said chamber permanently positioned within the latter and adapted to normally close both of said passageways into said chamber, and elongated, hollow inflating means of substantially uniform cross section throughout adapted to be inserted into said block through said passageway to the outside of the container to move said valve member against the resiliency of said block away from both of said passageways, said passageway to the outside of the container being of decreasing cross section from its exterior toward its interior end whereby it will form a tighter seal about said inflating means adjacent said valve chamber than remote therefrom.

6. In a controlling valve for a hollow container, a resilient body adapted to be interposed in, secured to, bear against the inner and outer faces of, and extend inwardly and outwardly with respect to the wall of the container, said body being formed between its transverse median and its inner end with a valve chamber having the outer portion of the wall thereof provided with a valve seat, said body being provided at the longitudinal center thereof with a bore extending from the outer end of said body and opening into said valve chamber, said body being provided diametrically with a passageway spaced from said valve seat and opening at the periphery of said body at opposite sides of the latter, said diametrically disposed passageway being intersected by said chamber to provide a pair of endwise aligning branches opening at their inner ends into said chamber at diametrically opposite points of the latter, and a hard non-yielding valve member permanently positioned within said chamber, the resiliency of said body providing for the wall of said chamber binding against said valve member to maintain the latter normally against its seat for closing said central passageway and for closing the inner ends of said branches, said valve providing when pressure is applied thereto to shift it inwardly from off its seat for the stretching of the inner portion of said member to expand the points of communication between said branches and said chamber.

JOSEPH W. WEAVER.